United States Patent [19]
Zingg et al.

[11] 3,842,910
[45] Oct. 22, 1974

[54] WELL FRACTURING METHOD USING LIQUEFIED GAS AS FRACTURING FLUID

[75] Inventors: Warren M. Zingg; Delbert D. Grassman, both of Tulsa, Okla.

[73] Assignee: The Dow Chemical Company, Midland, Mich.

[22] Filed: Oct. 4, 1973

[21] Appl. No.: 403,365

[52] U.S. Cl. ............................. 166/305 R, 166/308
[51] Int. Cl. ...................... E21b 43/25, E21b 43/26
[58] Field of Search ........ 166/305 R, 308, 307, 281, 166/302, 303, 259, 271

[56] References Cited
UNITED STATES PATENTS

| | | | |
|---|---|---|---|
| 3,108,636 | 10/1963 | Peterson | 166/308 |
| 3,195,634 | 7/1965 | Hill | 166/308 X |
| 3,202,108 | 8/1965 | Fly et al. | 166/308 X |
| 3,368,627 | 2/1968 | Hurst et al. | 166/308 X |
| 3,396,107 | 8/1968 | Hill | 166/308 X |
| 3,664,422 | 5/1972 | Bullen | 166/308 X |
| 3,696,035 | 10/1972 | Nimerick | 166/308 X |
| 3,766,986 | 10/1973 | Kiel | 166/308 |

Primary Examiner—Stephen J. Novosad
Attorney, Agent, or Firm—V. Dean Clausen; Lloyd S. Jowanovitz

[57] ABSTRACT

An improved method is disclosed for fracturing an oil well or gas well with a mixture of liquid carbon dioxide and liquid petroleum gas. The objective is to be able to inject the liquid into the wellbore at a relatively high pumping rate without causing the liquid to boil. Prior to injection, both the liquid $CO_2$ and the LPG are held in separate supply tanks at a temperature and pressure at which the liquid phase will not boil. The temperature of the LPG is substantially higher than the liquid $CO_2$. During the pumping operation, part of the liquid $CO_2$ and all of the LPG is fed through a heat exchanger. In the exchanger the amount of heat transferred from the LPG to the liquid $CO_2$ is enough to vaporize the liquid. The $CO_2$ vapor is then circulated back into the $CO_2$ tank. The recycled vapor thus maintains the liquid-vapor phase in the tank at equilibrium, so that the liquid will not boil at the desired pumping rate.

4 Claims, 1 Drawing Figure

PATENTED OCT 22 1974 3,842,910
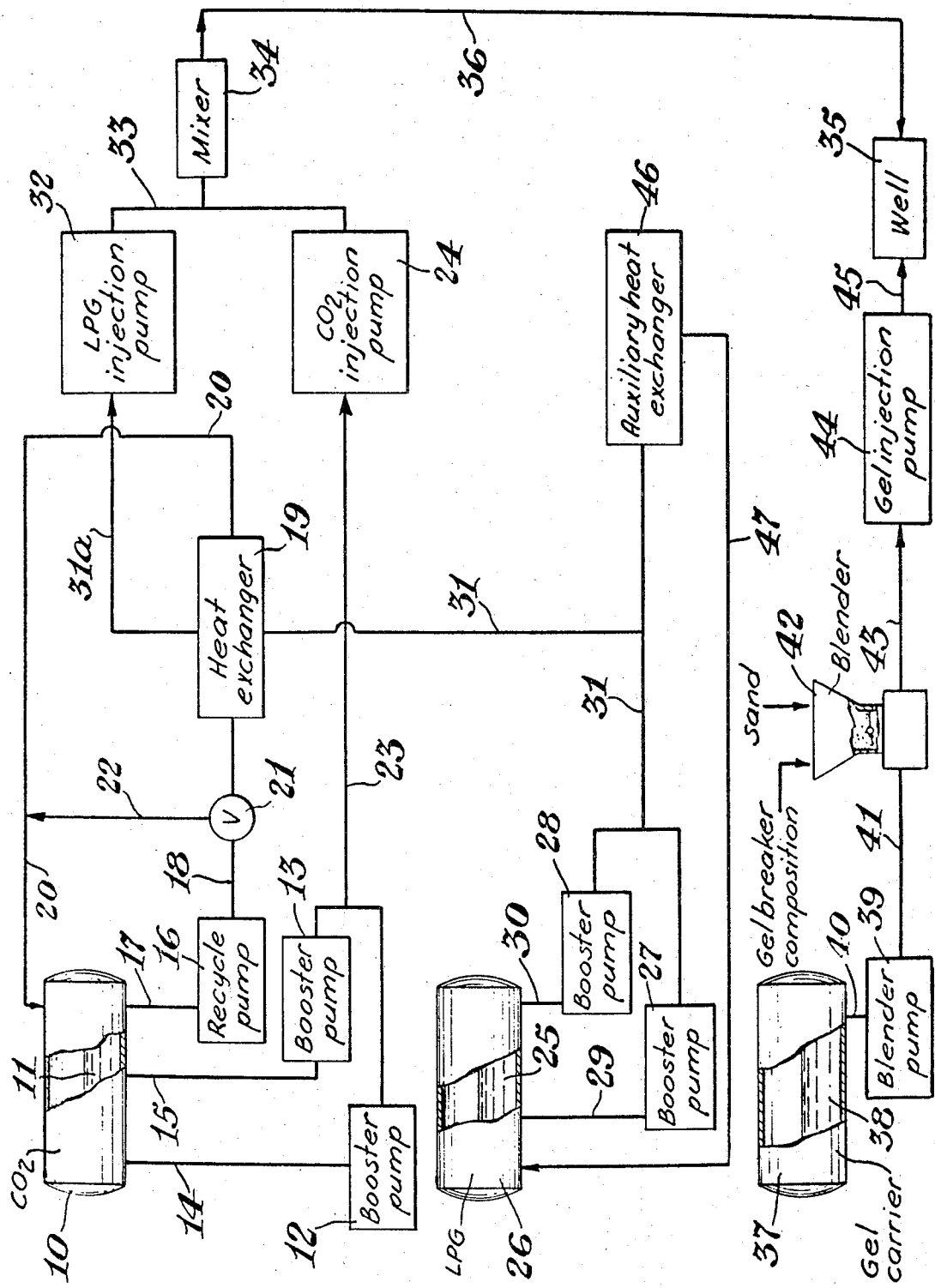

WELL FRACTURING METHOD USING LIQUEFIED GAS AS FRACTURING FLUID

BACKGROUND OF THE INVENTION

The invention relates broadly to treatment of subterranean earth formations to stimulate fluid flow. More specifically, the invention is directed to an improved method for injecting a mixture of liquid carbon dioxide and liquid petroleum gas, as a fracturing fluid, into an oil or gas well.

Various methods are employed to stimulate production of crude oil and natural gas from wells drilled in reservoirs of low permeability. A common procedure in use today is described in U.S. Pat. No. 3,368,627, to Hurst, et al. Briefly, this method involves pumping a mixture of liquid carbon dioxide and liquid petroleum gas down the bore hole, as the fracturing fluid, together with a gelled alcohol composition, which contains an entrained propping agent, such as sand. Because of higher temperatures in the formation the temperature of the liquid mix will rise substantially during penetration into the formation. To keep this liquid from vaporizing before fracturing occurs, fluid is injected into the borehole under high pressure. The injection pressure, for example, will be above the critical pressure at which the particular liquid mixture can vaporize at the formation temperature.

After the liquid has fractured the formation, the injection pressure is released and the liquid will immediately revert to the gas phase. The increase in volume and pressure, as initiated by the gas phase in contrast to the liquid phase, supplies sufficient energy for the fracturing fluid to remove itself from the formation. In addition, this energy also provides the drive needed to force the oil or gas out of the formation and into the wellbore.

On a typical job the liquid carbon dioxide and liquid petroleum gas are each pumped from separate supply tanks to a mixer. In the mixer the liquids are thoroughly blended and then injected into the well head as a homogeneous composition. Attached to each supply tank is a pair of conventional rotary vane pumps. The vane pumps, which function as booster pumps, remove the liquid from each supply tank and deliver it through a line to a positive displacement pump, such as a Triplex pump. The positive displacement pumps, which are injection pumps, push the liquids through the mixer and inject the mixture into the wellbore.

The use of liquid carbon dioxide, as one component of the fracturing fluid mixture, creates a problem on some jobs. The problem arises from the fact that it is difficult to pump liquid $CO_2$ at a high rate. We have found, for example, that a satisfactory rate for injecting the fracturing fluid into the wellbore is about 2 barrels per minute for each perforation in the casing. For this operating condition, therefore, the general rule is that the number of perforations which the fracturing fluid will flow through is directly proportional to the injection velocity of the fluid. For a satisfactory performance, our objective is to be able to pump each of the fracturing liquids (the $CO_2$ and LPG) and the carrier composition (the gelled alcohol which carries the sand propping agent) into the wellbore at rates of from about 10 to 25 barrels per minute.

In a typical well fracturing operation the liquid carbon dioxide arrives at the wellbore site in an insulated supply tank. The liquid is held in the tank at a temperature of about 0°F. and at the critical pressure of 300 p.s.i.g. At this temperature and pressure, we have found that the maximum rate at which the $CO_2$ can be removed from the supply tank is about 2.5 barrels per minute (BPM). At faster pumping rates the liquid phase will boil and generate vapor bubbles in the liquid. When these vapor bubbles are drawn into the injection pump, they collapse from being compressed on the discharge stroke. As the bubbles collapse they set up a condition of cavitation in the pump. In this condition the pump will operate very inefficiently and destruction of some of the metal parts occurs in a short time.

The reason that the liquid $CO_2$ boils when pumped at higher rates is related to the vapor pressure of the liquid. For example, the saturation vapor pressure of liquid $CO_2$ at 0°F. is about 300 p.s.i.a. This means that when a state of equilibrium is reached between the liquid $CO_2$, at a temperature of 0°F., and the vapor above the liquid surface in the supply tank, the vapor will exert an absolute pressure of 300 p.s.i.a. If the tank pressure is held at the critical pressure of 300 p.s.i.a., the liquid phase $CO_2$ will remain a liquid. However, if the liquid $CO_2$ is drawn out of the tank faster than the vapor phase can reach a state of equilibrium with the liquid, at the existing temperature, the liquid will boil.

SUMMARY OF THE INVENTION

Broadly, the invention provides a method of fracturing a subsurface earth formation, such as an oil well or a gas well. The preferred fracturing fluid comprises a mixture of liquid carbon dioxide and liquid petroleum gas. A gelled alcohol solution, which carries a propping agent, such as sand, is combined with the fracturing fluid and the extire mix is injected into the well simultaneously. Prior to injection the liquid carbon dioxide and liquid petroleum gas are stored at the wellbore site in separate supply tanks. In each tank the liquids are held at a temperature and pressure at which the liquid phase will not boil.

In the injection operation a small portion of the liquid $CO_2$ is pumped through one side of a heat exchanger means. At the same time, the LPG, which is at a higher temperature than the $CO_2$, is pumped through the other side of the heat exchanger. As the liquids pass through the heat exchanger, heat is transferred from the LPG to the $CO_2$. The quantity of heat transferred to to $CO_2$ is sufficient to vaporize the liquid phase.

From the heat exchanger the $CO_2$ vapor is circulated back into the $CO_2$ container. The recycled $CO_2$ vapor thus maintains sufficient pressure on the liquid phase $CO_2$ to prevent the liquid from boiling. After passing through the heat exchanger, the LPG is pumped into a mixer. The remaining portion of the liquid $CO_2$, which is that portion not sent to the heat exchanger, is pumped directly to the mixer. In the mixer, the liquid $CO_2$ and the LPG are blended to obtain a homogeneous fluid, and the mixture is injected directly into the wellbore along with the alcohol carrier solution.

Accordingly, a broad object of the invention is to provide a method for fracturing an earth formation with a liquid mixture of $CO_2$ and LPG in which the liquid can be injected into the wellbore at faster rates than has been possible heretofore.

A more specific object is to provide a method for maintaining an equilibrium vapor pressure on the liquid $CO_2$ to prevent the liquid from boiling as it is pumped into the wellbore.

DESCRIPTION OF THE DRAWING

The single FIGURE shown herein is a schematic drawing which illustrates a well fracturing system used in the practice of this invention.

DESCRIPTION OF A PREFERRED EMBODIMENT

Referring to the drawing, a tank 10 provides a container for holding a supply of liquid carbon dioxide 11. Prior to injection into the wellbore the liquid carbon dioxide is held in the tank at 0°F. and 300 p.s.i.g. A pair of conventional rotary vane pumps 12 and 13, which function as booster pumps, are connected into tank 10 at inlet lines 14 and 15. A third rotary vane pump 16, which functions as a recycling pump, is also connected into tank 10 at inlet line 17.

On the discharge side of pump 16 a line 18 connects the pump into a heat exchanger unit 19. Suitable heat exchanger units which may be used are those referred to as direct-fired or plate coil heat exchangers. The heat exchanger 19 is connected into the top of supply tank 10 through a vapor return line 20. In tank 10 the return line 20 connects into a distribution header (not shown). The purpose of the header is to distribute heated $CO_2$ vapor uniformly to the liquid-vapor interface in tank 10.

A temperature control valve 21 (3-way valve) is installed in discharge line 18 between recycle pump 16 and heat exchanger 19. From one outlet of valve 21, a line 22 connects the valve directly into vapor return line 20 between the heat exchanger 19 and the supply tank 10. The booster pumps 12 and 13, for the $CO_2$, are connected by a common discharge line 23 into an injection pump 24. A storage container for the liquid petroleum gas 25 is provided by a tank 26.

The liquid petroleum gas 25 is pumped from tank 26 by booster pumps 27 and 28, which are connected into tank 26 at inlet lines 29 and 30. Pumps 27 and 28 are conventional rotary vane pumps of the same type as the carbon dioxide booster pumps. A common discharge line 31 connects both of the pumps 27 and 28 into heat exchanger 19. In turn, heat exchanger 19 is connected into a second injection pump 32 through an outlet line 31a. Injection pumps 24 and 32 are commercially available positive displacement pumps, sold under the name Triplex.

On the discharge side, injection pumps 24 and 32 are connected by a common line 33 into a mixing apparatus 34. From mixer 34, the liquid gas mixture is injected directly into the wellbore 35 through an injection line 36. A third tank 37 serves as a supply tank for containing a carrier composition 38. The purpose of carrier composition 38 is to carry a propping agent, such as sand, into the formation. A typical carrier composition comprises an anhydrous alcohol, such as methanol, which contains a gelling agent, such as hydroxyalkyl cellulose. Preferred carrier compositions which may be used are those described in U.S. Pat. No. 3,664,422 to Bullen, and U.S. application Ser. No. 241,816, filed April 6, 1972, now allowed.

A centrifugal pump 39 connects into tank 37 at inlet line 40. On the discharge side a line 41 connects the pump 39 into a closed blender apparatus 42. In blender 42 the sand propping agent and a gel breaker composition are blended into the carrier alcohol to obtain a homogeneous fluid. From blender 42 the carrier mixture is delivered to an outlet line 43 and to an injection pump 44 (Triplex pump). Pump 44 injects the mixture directly into the wellbore 35 through discharge line 45.

A typical well fracturing operation utilizing the method of this invention will now be described. Before the pumping operation begins the liquid $CO_2$ in tank 10 is held at a temperature of about 0°F. and at the critical pressure of 300 p.s.i.g. The composition of the LPG delivered to the wellbore site is a mixture of propane and butane. The relative proportions of propane and butane in the LPG mixture will depend on certain properties which it is desired to have in the fracturing fluid.

A primary factor in determining the actual composition of the fracturing fluid mixture is the bottom hole temperature in the well. Based on actual field practice, the general rule is that the fracturing fluid composition should normally be a mixture of liquid $CO_2$ and LPG which has a critical temperature of from 10°F. to 25°F. below the bottom hole temperature of the well. For example, if the bottom hole temperature is about 215°F. the critical temperature of the fracturing fluid should be about 190°F.

In the practice of the present method, an operable pumping rate is in the range of from about 10 to 25 barrels per minute. This pumping rate applies to each of the three fluids used in the system, that is, the liquid $CO_2$, the liquid petroleum gas, and the gel carrier composition. The booster pumps 12 and 13, for the $CO_2$ tank, and the pumps 27 and 28, for the LPG tank, have a maximum capacity of 6 barrels per minute. To achieve the desired pumping rate, therefore, it is necessary to use two supply tanks, each equipped with two booster pumps, to pump each of the liquid gases into the well.

During the pumping operation most of the liquid $CO_2$ is removed from tank 10 and delivered to injection pump 24 by the vane pumps 12 and 13. Pumps 12 and 13 boost the pressure on the liquid in the discharge line 23 to about 350 p.s.i.g., to offset pressure drop created in the line on the suction stroke of injection pump 24. At the same time, a small portion of the $CO_2$ liquid is pumped into heat exchanger 19 by the recycling pump 16. From tank 26 the LPG is pumped to the heat exchanger 19 by the vane pumps 27 and 28. Pressure on the LPG liquid in lines 21 and 31a is also boosted to offset pressure drop created in these lines by the suction of injection pump 32.

Referring to the $CO_2$ liquid which is circulated through heat exchanger 19, the temperature of the liquid at the inlet of the heat exchanger will be about 0°F. With regard to the LPG, this liquid is held in tank 26 at about 100°F. and at a critical pressure of about 200 p.s.i.g. At the inlet of heat exchanger 19, therefore, the inlet temperature of the LPG will be about 100°F. As the liquefied gases pass through the heat exchanger 19, the heat energy transfer from the LPG to the $CO_2$ will be about 6.08 MM Btu/per hour. At this energy output, the outlet temperature of the LPG from heat exchanger 19 will drop to about 67°F.

The heat energy input to the $CO_2$ in heat exchanger 19 will increase the temperature of the $CO_2$ to about 40°F. The increase in temperature of the $CO_2$ will also increase the vapor pressure sufficently to completely vaporize the liquid. As the heated $CO_2$ vapor leaves heat exchanger 19 it is continuously circulated through return line 20 and back into supply tank 10. The recycled $CO_2$ vapor thus maintains the vapor phase in tank 10 at the saturation vapor pressure of 300 p.s.i.a., at 0°F. When this condition is maintained in tank 10, therefore, the liquid will not boil at the desired pumping rate of 25 barrels per minute.

As mentioned above, if the $CO_2$ liquid boils during pumping, a condition of cavitation will be set up in the injection pump 24, which is detrimental to the pump itself and to the entire operation. In the practice of this invention, the cavitation problem has been overcome by being able to increase the NPSH (net positive suction head) requirement of the injection pump. An increase in available NPSH for the pump is made possible by the recycling of the heated $CO_2$ vapors back into supply tank 10.

The formula for calculating available NPSH for a pump is as follows:

$$H_{sv} = H_a - H_{vpa} \pm H_s - H_f$$

$H_a$ = Absolute pressure in feet of liquid on the surface of the liquid from which the pump takes its suction. This will be the atmospheric pressure available at the unit in the case of an open tank, or the absolute pressure above the liquid in a closed tank.

$H_{vpa}$ = The vapor pressure of the liquid at the pumping temperature expressed in feet of liquid, absolute.

$H_s$ = The height of the liquid surface in the suction tank in feet above or below the pump centerline. (Positive if the liquid level is above the pump, negative if the liquid level is below the pump.)

$H_f$ = Head loss in feet between the liquid surface and the suction flange of the pump due to friction and turbulence.

Another way of expressing the NPSH requirement of a pump is to define it as the total head in feet of liquid absolute, determined at the suction nozzle and referred to the center line of the pump, less the vapor pressure of the liquid.

From the injection pumps 24 and 32, the liquid $CO_2$ and LPG are directed through a line 33 into a turbulator mixer 34. In mixer 34 the fluids are blended to obtain a homogeneous composition before injecting the fluid through line 36 into a wellbore 35. For this operation, various commercially available turbulator mixers may be used. One example of a suitable mixer is a "bow tie" static mixer (Kenics Corp., Danvers, Mass.) Another example is an interfacial surface generator mixer, as described in U.S. Pat. No. 3,404,869.

The sand propping agent and breaker composition are blended into the gelled alcohol carrier composition in a closed blender 42. The entire mix is then injected into wellbore 35, by pump 44, together with the liquefied gas fracturing fluid. A suitable blender apparatus is described in U.S. Pat. No. 3,326,536.

The respective components of the various fluids injected into the wellbore are mixed in a ratio such that the mixture remains a liquid at formation conditions, so long as the fluid is held under adequate pressure and below its critical temperature. After the fluid is heated to temperature in the reservoir, the pressure is released at the well head and the liquid flashes to a gas. The gas phase rapidly removes itself from the wellbore and at the same time stimulates flow of oil or gas from the formation.

In practice, the use of the liquid petroleum gas as a heating medium to vaporize part of the $CO_2$ and thus repressure the $CO_2$ in supply tank 10, operates very satisfactorily so long as the temperature of the LPG stays above 65°F. At a temperature below 65°F., however, the available heat energy from the LPG is not sufficient to vaporize the $CO_2$ liquid which passes through heat exchanger 19. This problem can be overcome by providing an auxiliary heat exchanger 46, which connects into discharge line 31 on the inlet side and into the LPG tank 26 through an outlet line 47. When a well fracturing operation is conducted during cooler weather conditions, therefore, the LPG can be passed directly from tank 26 through heat exchanger 46. This enables a preliminary warm-up of the LPG before commencing the operation.

Another auxialiary system is provided by the temperature control valve 21. For example, if the CO2 liquid being pumped through line 18 should become hot enough to vaporize, that is above the critical temperature of 88°F., the valve 21 will close on the heat exchanger side so that the liquid is directed back into tank 10 through outlet line 22 and return line 20.

What is claimed is:

1. A method for treating a subsurface earth formation penetrated by a wellbore, which comprises the steps of:

providing at the wellbore site a container of liquid carbon dioxide, the said carbon dioxide being stored in the container at a temperature and pressure at which the liquid phase will not boil;

providing at the wellbore site a container of liquid petroleum gas, the said petroleum gas being stored in the container at a temperature and pressure at which the liquid phase will not boil;

pumping a first portion of the liquid carbon dioxide from the container through a heat exchanger means at a given rate;

pumping the liquid petroleum gas through the heat exchanger means, and into a mixer means at a given rate;

transferring heat within the heat exchanger means from the liquid petroleum gas to the said first portion of liquid carbon dioxide, to thereby heat the said liquid carbon dioxide to a temperature at which the liquid phase will vaporize;

passing the carbon dioxide vapors from the heat exchanger back into the carbon dioxide container, to thereby maintain sufficient pressure on the liquid phase carbon dioxide to prevent the liquid from boiling at the rate at which the liquid is pumped from the container;

pumping a second portion of the liquid phase carbon dioxide from the container through the mixer means at a given rate;

mixing the liquid carbon dioxide and liquid petroleum gas in the mixer means;

pumping the liquid mixture of carbon dioxide and petroleum gas into the wellbore at a given rate; and simultaneously pumping into the wellbore at a given rate a carrier composition which comprises a fluid composition containing a solid propping material.

2. The method of claim 1 in which the liquid carbon dioxide is stored in the container at a temperature of about 0°F. and at a pressure of about 300 p.s.i.g.

3. The method of claim 1 in which the liquid petroleum gas is stored in the container at a temperature of about 100°F. and at a pressure of about 200 p.s.i.g.

4. The method of claim 1 in which the liquid carbon dioxide, the liquid petroleum gas, and the carrier composition are each pumped into the wellbore at a rate of from about 10 barrels per minute to 25 barrels per minute.

* * * * *